Figure 1:
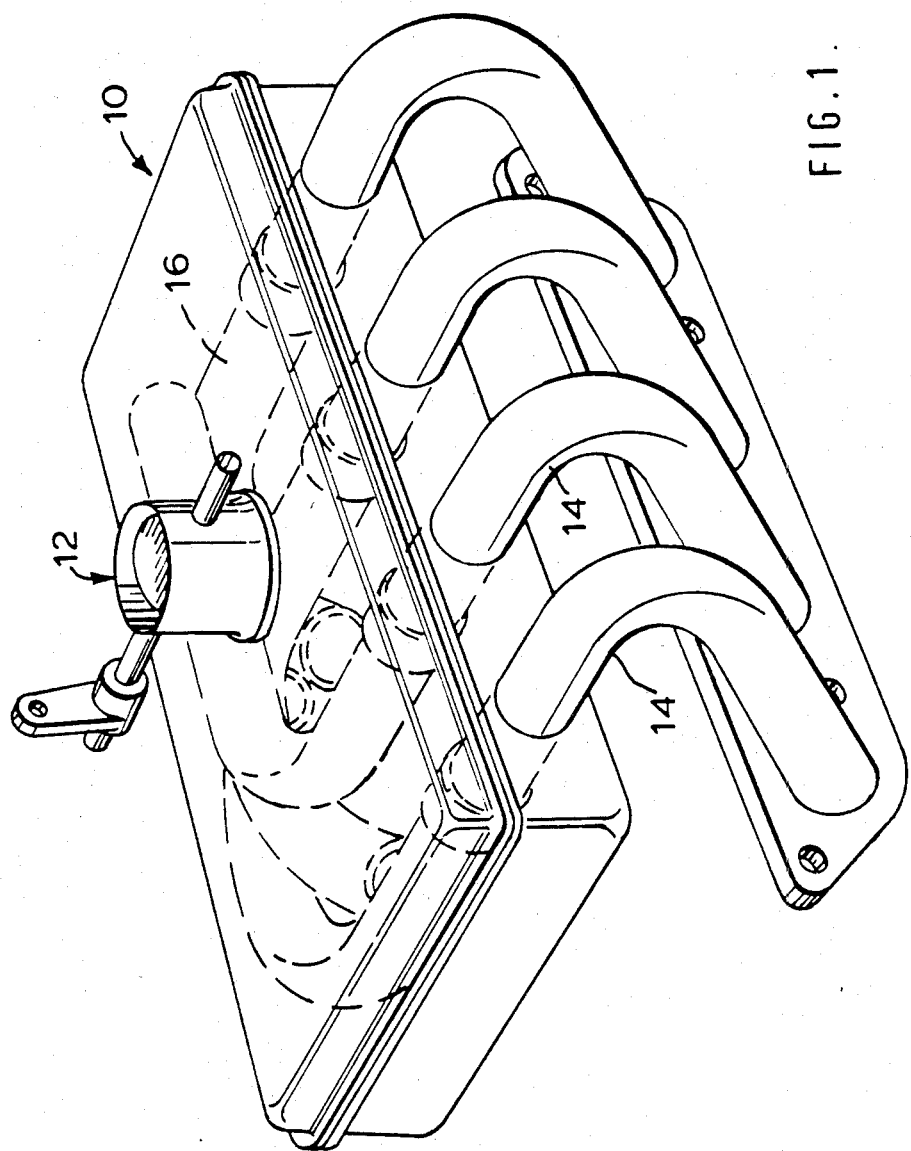

United States Patent [19]

Ma

[11] Patent Number: 4,543,918
[45] Date of Patent: Oct. 1, 1985

[54] INTAKE MANIFOLD FOR AN INTERNAL COMBUSTION ENGINE

[75] Inventor: Thomas T. Ma, Chelmsford, United Kingdom

[73] Assignee: Ford Motor Company, Dearborn, Mich.

[21] Appl. No.: 544,943

[22] Filed: Oct. 24, 1983

[30] Foreign Application Priority Data

Dec. 24, 1982 [GB] United Kingdom ............... 8236758

[51] Int. Cl.⁴ ............................................. F02B 29/00
[52] U.S. Cl. ............................................. 123/52 MB
[58] Field of Search ..................... 123/52 M, 52 MB

[56] References Cited

U.S. PATENT DOCUMENTS 2,001,669  5/1935  Smith ........................... 123/52 MB
4,300,488  11/1981  Cser ............................. 123/52 MB

FOREIGN PATENT DOCUMENTS 0214157  3/1958  Australia ...................... 123/52 MB Primary Examiner—Craig R. Feinberg
Attorney, Agent, or Firm—Robert E. McCollum; Clifford L. Sadler

[57] ABSTRACT

The invention relates to an induction manifold for a fuel injected internal combustion engine which comprises a rigid plenum chamber, intake pipes extending from the plenum chamber to the individual engine cylinders, and extensions of the individual intake pipes disposed within the plenum chamber. This construction enables the manifold to be tuned without occupying excessive space in the engine compartment.

2 Claims, 4 Drawing Figures

U.S. Patent Oct. 1, 1985 Sheet 2 of 2 4,543,918

INTAKE MANIFOLD FOR AN INTERNAL COMBUSTION ENGINE

The present invention relates to an intake manifold for an internal combustion engine.

In the tuning of motor vehicles, it has already been appreciated that the length of an induction pipe leading to a cylinder has a significant effect on the power and that by appropriate selection of the length of the induction pipe the performance can be optimized for a particular engine speed. Usually, the lengths required are quite long and because an induction manifold needs to be rigid in order to withstand vacuum pressure conventional tuned manifolds have required long rigid coils. Such a construction is unacceptable for commercial motor vehicles since it clutters the engine compartment, creates design difficulties and makes for difficult servicing.

The present invention seeks to enable the advantages of a tuned induction manifold to be obtained while avoiding or at least reducing the above problems.

In accordance with the present invention, there is provided an induction manifold for a fuel injected internal combustion engine which comprises a rigid plenum chamber, intake pipes extending from the plenum chamber to the individual cylinders, and extensions of the individual intake pipes disposed within the plenum chamber.

In practice, only the plenum chamber and the intake pipes need to be made of a material strong enough to withstand the intake vacuum and the extensions of the intake pipes disposed within the plenum chamber can be made of a semi-rigid material which can be flexibly disposed and stored within the plenum chamber.

The extensions can thus be of any length necessary to tune the intake manifold and the length of the individual intake pipes can be varied at will without altering the external configuration and layout of the intake manifold. Furthermore, because the extensions can be neatly packaged within the plenum chamber, they need not interfere with access to the engine, for example when servicing.

The throttle for the air intake is connected within the air supply pipe to the plenum chamber with the result that the intake manifold vacuum pressure prevails all through the plenum chamber. Thus, the pressures inside and outside the extensions of the individual intake pipes disposed within the plenum chamber are substantially equal and it is this equalisation of the pressure which permits the extensions to be made of a semi-rigid material. Nevertheless, the pipes serve to confine the pressure waves traveling towards the engine cylinder and the length of the pipes affect the timing ot these pressure waves. At the optimum length, a compression wave reaches the inlet port of the cylinder at a time coinciding with the closing of the valve to ensure the intake charge pressure is maximised just when the inlet valve closes, thereby ensuring the maximum admission of charge into the cylinder for combustion.

Because the extensions of the intake pipes are arranged within a plenum chamber in which the pressure is substantially constant, they can be formed of separate pipes joined to one another and the seal between the pipes is not critical. Consequently, it would be possible to form the pipes of telescopically collapsible tubes and for these to be moved in and out by a control mechanism in a trombone like fashion so as to tune the intake manifold for all engine speeds, but such a mechanism is believed unduly conplicated.

If two pipes are placed ene to end, then should the gap between them be negligible the effective length of the intake pipe is the combined length of the two pipes. On the other hand, if the gap is large then only the first pipe will be effective. These two effective intake pipe lengths correspond to two tuned conditions which are optimum for two different engine speeds. The effect of progressively widening the gap from a fully closed position to a fully open position, as one may deduce empirically, is to cause a gradual shift from one tuned condition to the other and one can, by appropriate dimensioning of the gap, achieve broad band tuning which retains substantially the performance from both the tuned conditions but without the complication of moving parts.

Thus, in a preferred feature of the invention, the extensions of the intake pipes arranged within the plenum chamber include slots or gaps in order to provide such broad band tuning.

Figure 2:
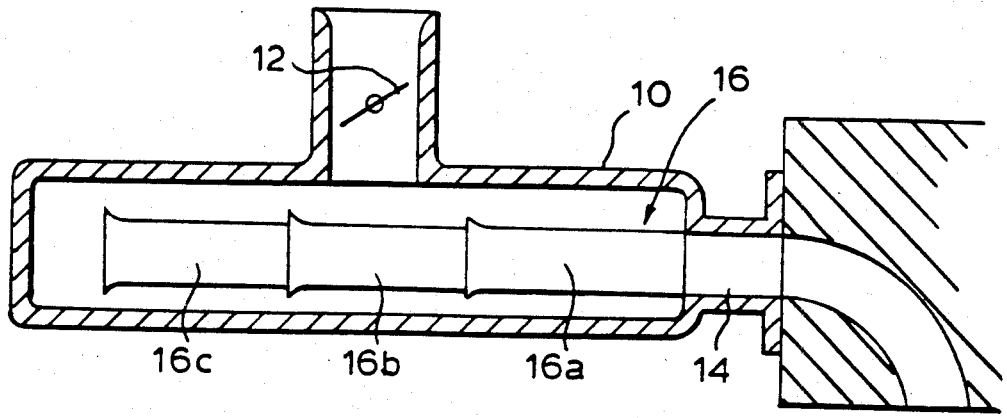
Figure 3:
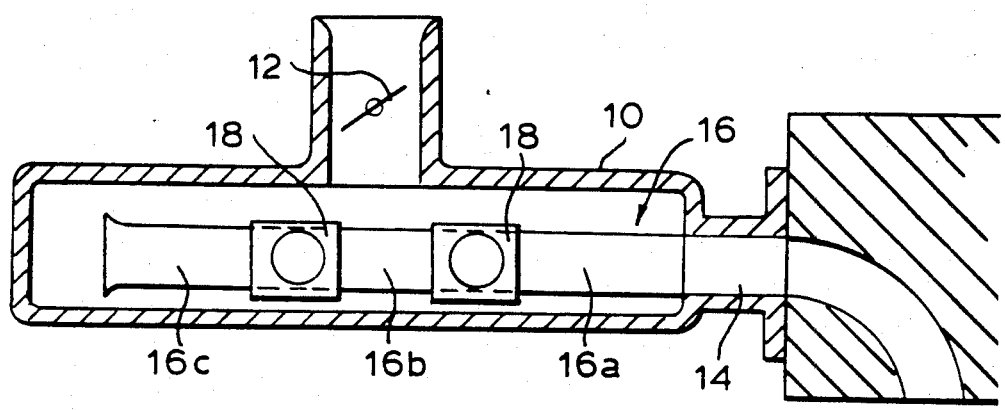
Figure 4:
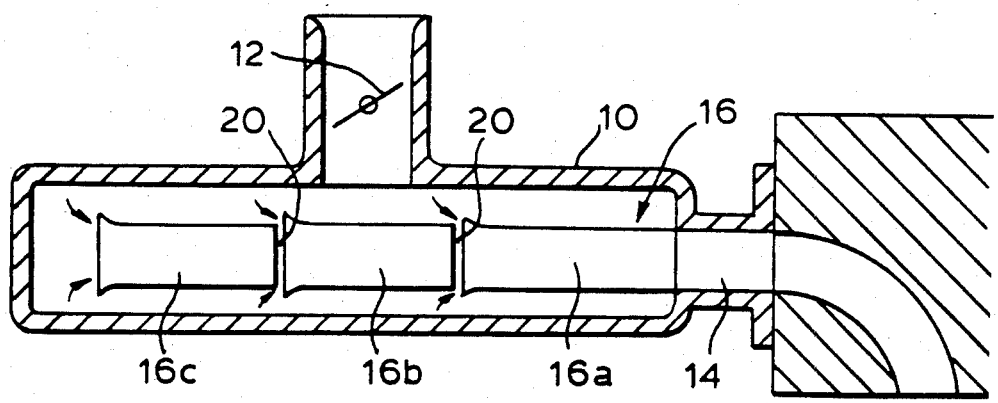

The invention will now be described further, by way of example, with reference to the accompanying drawings, in which:

FIG. 1 is a perspective schematic view of an intake manifold illustrating the basic concept of the invention, FIG. 2 is a section through a first intake manifold which has movable sections to give a range of selectable tuned lengths, FIG. 3 shows a further embodiment providing switchable control valves to achieve a range of selectable tuned lengths, and FIG. 4 shows an embodiment having fixed sections arranged in series and mounted with a controlled gap between each section to achieve broad band tuning.

In FIG. 1, there is shown an intake manifold which comprises a plenum chamber 10 with an intake butterfly valve 12. The plenum chamber 10 is connected to four intake pipes 14 which lead to the cylinder block. Each of the intake pipes 14 has within the plenum chamber 10 an extension 16, the walls of which need not be capable of withstanding the full manifold pressure.

Thus each intake branch is a tuned length which includes a joint disposed within a common plenum chamber 10. A substantial proportion of each tuned length is packaged within the plenum chamber 10. This is quite acceptable for a fuel injection manifold since there is no fuel in the plenum chamber and air will find its way to each branch automatically. The plenum chamber 10 is designed to withstand boost or vacuum but the tuned extensions are not subjected to any pressure or vacuum load. It is for this reason that only the portions 14 of the intake pipes lying outside the plenum chamber 10 need be of rigid construction.

This arrangement makes is easy to accommodate a complex manifold system inside a simple box structure which fits readily in the engine compartment. There is complete freedom in the arrangement of the extensions 16 as long as they are confined within the plenum chamber. For example, each enclosed extension 16 may be made easily interchangeable with another extension so as to match its tuned length with any engine specification. Alternatively, each extension can be broken into a number of sections which can be coupled together in a number of configurations to make up different tuned lengths selectable according to a predetermined engine requirement schedule. The joints between these sections and the joints with the outside branches can be of simple construction which need not be completely leakproof since the joints are still enclosed within the plenum chamber 10.

The enclosed extensions can be made in a plastics or other suitable material, they may be flexible or semiflexible and they may carry a number of branches and mechanical parts freely supported within the confines of the plenum chamber.

In FIG. 2, there is shown schematically an emboidment in which an extension 16 within the plenum chamber 10 is formed of three sections 16a, 16b and 16c. These may be movable relative to one another so that the tuned length may be selected in accordance with the engine speed.

FIG. 3 shows a further embodiment in which control valves 18 are provided between the individual lengths 16a, 16b and 16c which are analogous to the similarly numbered sections in FIG. 2. By suitable control of the valves 18, the tuned length may once again be adjusted to suit engine speed. However, both of the above arrangements require movable parts and this makes the system complicated.

The arrangement of FIG. 4 has three separate sections 16a, 16b and 16c which in this case are spaced from one another by fixed predetermined gaps 20. In this arrangement, a comprise or broad band form of tuning is achieved which eliminates the need for the actuators required in FIGS. 2 and 3 to alter the tuned lengths.

I claim:

1. An induction manifold for a fuel injected multiple cylinder internal combustion engine which comprises a rigid air plenum chamber receiving a supply of air therein, a separate individual air intake pipe extending from the plenum chamber directly to each of individual engine cylinders, and an extension connected directly to each individual intake pipe and disposed within the plenum chamber for uniform uninterrupted supply of air to each individual intake pipe via its extension, each extension comprising a plurality of axially aligned and uniformly spaced pipe sections completely contained within said plenum chamber together providing an effective tuned length of intake pipe.

2. An induction manifold as in Claim 1, wherein the plenum and intake pipes are of a rigid material, and the pipe sections of each extension are formed of a semi rigid flexible material, the latter usage being permitted by the air pressures inside and outside the pipe section being equal.

* * * * *